(12) United States Patent
Fukushima et al.

(10) Patent No.: US 8,557,898 B2
(45) Date of Patent: Oct. 15, 2013

(54) WOODY SYNTHETIC RESIN COMPOSITION HAVING IMPROVED WEATHER RESISTANCE AND MOLDED BODY THEREOF

(75) Inventors: Mitsuru Fukushima, Saitama (JP); Shigeo Mizokawa, Saitama (JP); Masumi Mizu, Saitama (JP)

(73) Assignee: Adeka Corporation, Tokyo (JP)

( * ) Notice: Subject to any disclaimer, the term of this patent is extended or adjusted under 35 U.S.C. 154(b) by 280 days.

(21) Appl. No.: 12/919,955

(22) PCT Filed: Feb. 16, 2009

(86) PCT No.: PCT/JP2009/052539
§ 371 (c)(1),
(2), (4) Date: Aug. 27, 2010

(87) PCT Pub. No.: WO2009/107502
PCT Pub. Date: Sep. 3, 2009

(65) Prior Publication Data
US 2011/0015307 A1    Jan. 20, 2011

(30) Foreign Application Priority Data

Feb. 29, 2008    (JP) .................................. 2008-051060

(51) Int. Cl.
*B29C 47/00* (2006.01)
*C08L 97/02* (2006.01)

(52) U.S. Cl.
USPC ................................................ 524/13; 524/9

(58) Field of Classification Search
USPC ........................................................... 524/13
See application file for complete search history.

(56) References Cited

U.S. PATENT DOCUMENTS

| | | | |
|---|---|---|---|
| 6,117,995 A | 9/2000 | Zedda et al. | |
| 2002/0058735 A1 | 5/2002 | Galbo et al. | |
| 2006/0183821 A1 | 8/2006 | Kaspers et al. | |
| 2007/0191516 A1* | 8/2007 | Frey et al. | 524/99 |
| 2009/0111699 A1* | 4/2009 | Negishi et al. | 504/361 |
| 2010/0190898 A1 | 7/2010 | Negishi et al. | |

FOREIGN PATENT DOCUMENTS

| | | |
|---|---|---|
| CN | 1257890 A | 6/2000 |
| CN | 1926107 A | 3/2007 |
| EP | 1731508 A1 | 12/2006 |
| JP | 2000-239432 A | 9/2000 |
| JP | 2000-301670 A | 10/2000 |
| JP | 2001-98114 A | 4/2001 |
| JP | 2002-38018 A | 2/2002 |
| JP | 2004-44232 A | 2/2004 |
| JP | 2004044232 A * | 2/2004 |
| JP | 2004-174721 A | 6/2004 |
| JP | 2007-529467 A | 10/2007 |
| WO | WO 2004/094120 A1 | 11/2004 |
| WO | WO 2005/082852 A1 | 9/2005 |
| WO | WO 2005/090307 A1 | 9/2005 |
| WO | WO 2008/077830 A2 | 7/2008 |

OTHER PUBLICATIONS

Muasher et al., Polymer Degradation and Stability, 91, 1156-1165, 2006.*
Ciba, Technical Data Sheet of Tinuvin 123, 1994.*
International Search Report dated May 19, 2009, issued in PCT/JP2009/052539.
Chinese Office Action issued in Chinese Patent Application No. 200980106676.6 on Feb. 3, 2012.
Extended European Search Report dated Jan. 4, 2013 for European Application No. 09715934.7.

* cited by examiner

*Primary Examiner* — Hui Chin
(74) *Attorney, Agent, or Firm* — Birch, Stewart, Kolasch & Birch, LLP

(57) ABSTRACT

The invention provides a woody synthetic resin composition having excellent weather resistance, and a molded body thereof. The synthetic resin composition of the invention contains a wood flour in an amount of 5 to 200 parts by mass and a hindered amine compound having a partial structure represented by the following general formula (1)

$$\begin{array}{c} R^1 \quad R^2 \\ \diagdown \diagup \\ \diagup \diagdown \\ N{-}O{-}R \\ \diagdown \diagup \\ \diagup \diagdown \\ R^3 \quad R^4 \end{array} \quad (1)$$

wherein $R^1, R^2, R^3$ and $R^4$ each independently represents an alkyl group having 1 to 4 carbon atoms, and R represents an alkyl group having 1 to 18 carbon atoms, an alkyl group substituted by hydroxyl group having 1 to 18 carbon atoms or a cycloalkyl group having 5 to 8 carbon atoms, in an amount of 0.01 to 5 parts by mass, with respect to 100 parts by mass of a synthetic resin, and a molded body thereof.

5 Claims, No Drawings

WOODY SYNTHETIC RESIN COMPOSITION HAVING IMPROVED WEATHER RESISTANCE AND MOLDED BODY THEREOF

TECHNICAL FIELD

The present invention relates to a woody synthetic resin composition and a molded body thereof. More particularly, the present invention relates to a woody synthetic resin composition having highly improved weather resistance and a molded body thereof.

BACKGROUND ART

Conventionally, a woody synthetic resin composition having a texture near to natural wood, which is molded by adding wood flour to a synthetic resin, has been used in building interior/exterior materials, automotive interior materials, and the like. Since a natural wood material is poor in abrasion resistance, corrosion resistance and the like, a woody synthetic resin superior in these performances is attracting attention.

However, there is a problem that the adding wood flour to a synthetic resin causes an excessive deterioration of weather resistance. As a countermeasure, it has been proposed to cover or coat a molded article with a resin having good weather resistance. For example, Patent Document 1 discloses a molded article having woodgrain pattern, covered with a transparent weather-resistant resin. Patent Document 2 discloses a material having wooden texture of which the surface of outer layer portion is embossed or sanded.

In addition, for the purpose of improvement of weather resistance, it has been proposed to add anti-weathering agents such as an inorganic filler, an ultraviolet absorber and a light stabilizer. For example, Patent Document 3 discloses a resin composition having wood flour which contains an inorganic filler. Patent Document 4 discloses the addition of anti-weathering agent to coating layer. Additionally, Patent Document 5 discloses a resin composition containing iron-based compounds such as iron hydroxide and iron sulfate, in order to improve weather resistance.

Patent Document 1: Japanese Unexamined Patent Application Publication No. 2000-239432
Patent Document 2: Japanese Unexamined Patent Application Publication No. 2000-301670
Patent Document 3: Japanese Unexamined Patent Application Publication No. 2001-098114
Patent Document 4: Japanese Unexamined Patent Application Publication No. 2004-174721
Patent Document 5: Japanese Unexamined Patent Application Publication No. 2002-038018

DISCLOSURE OF THE INVENTION

Problems to be Solved by the Invention

However, although the methods in Patent Documents 1 and 2 improve weather resistance of molded article, various problems have been pointed out, including complication of manufacturing process and intricacy of metal mold structure.

Further, the methods in Patent Documents 3 to 5 in which anti-weathering agents such as an inorganic filler, an ultraviolet absorber and a light stabilizer are added in order to improve weather resistance have problems such that a great amount of the additives is required for obtaining the effect, and consequently none of the methods give sufficiently satisfactory. Moreover, the method in Patent Document 4 which proposes adding anti-weathering agent to coating layer gives inadequate effect of weather resistance, due to antagonistic activity of acid generated from wood flour on light stabilizer.

Under such circumstances, an object of the present invention is to provide a woody synthetic resin composition having excellent weather resistance and a molded body thereof that can solve the above problems.

Means for Solving the Problems

The present inventors have intensively studied to meet the object, and have finally found that excellent weather resistance can be achieved by using a certain hindered amine compound, thereby completing the present invention.

That is, a woody synthetic resin composition according to the present invention comprises a wood flour in an amount of 5 to 200 parts by mass and a hindered amine compound having a partial structure represented by the following general formula (1):

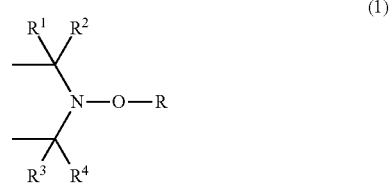

(wherein $R^1$, $R^2$, $R^3$ and $R^4$ each independently represents an alkyl group having 1 to 4 carbon atoms, and R represents an alkyl group having 1 to 18 carbon atoms, an alkyl group substituted by hydroxyl group having 1 to 18 carbon atoms or a cycloalkyl group having 5 to 8 carbon atoms) in an amount of 0.01 to 5 parts by mass with respect to 100 parts by mass of a synthetic resin.

In addition, in the woody synthetic resin composition according to the present invention, the hindered amine compound having a partial structure represented by the above general formula (1) is preferably a compound represented by the following general formula (2):

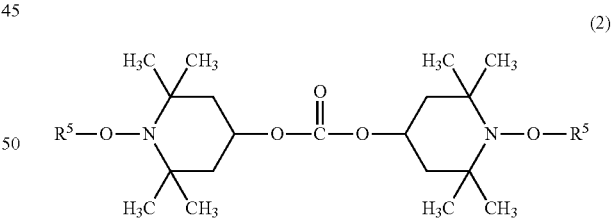

(wherein $R^5$ represents an alkyl group having 1 to 18 carbon atoms, an alkyl group substituted by hydroxyl group having 1 to 18 carbon atoms or a cycloalkyl group having 5 to 8 carbon atoms).

Additionally, in the woody synthetic resin composition according to the present invention, the synthetic resin is preferably a polyolefin-based resin, and the polyolefin-based resin is preferably a polyethylene resin, a polypropylene resin or an ethylene-propylene copolymer resin.

Furthermore, a woody synthetic resin molded body with improved weather resistance according to the present invention is obtained by molding the woody synthetic resin composition.

Effects of the Invention

The present invention can provide a woody synthetic resin composition having excellent weather resistance and a molded body thereof.

BEST MODE FOR CARRYING OUT THE INVENTION

The present invention will be described in more details below.

Examples of a synthetic resin to be used according to the present invention include in the form of a thermoplastic resin: polyolefins or copolymers thereof, including α-olefin polymers, such as polypropylene, high density polyethylene, low density polyethylene, linear low density polyethylene, polybutene-1 and poly-4-methylpentene, ethylene-vinyl acetate copolymers and ethylene-propylene copolymers; halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic acid ester copolymers, vinyl chloride-maleic acid ester copolymers, and vinyl chloride-cyclohexyl maleimide copolymers; petroleum resins; coumarone resins; polystyrene; polyvinyl acetate; acrylic resins; copolymers of either or both of styrene and α-methylstyrene with other monomer(s), (e.g. maleic anhydride, phenylmaleimide, methyl methacrylate, butadiene, and acrylonitrile), such as AS resins, ABS resins, MBS resins, and heat resistant ABS resins; polymethyl methacrylate; polyvinyl alcohol; polyvinyl formal; polyvinyl butyral; linear polyesters, such as polyethylene terephthalate and polytetramethylene terephthalate; polyphenylene oxide; polyamides, such as polycaprolactam and polyhexamethylene adipamide; polycarbonate; branched polycarbonate; polyacetal; polyphenylene sulfide; polyurethane; and cellulosic resins; and mixtures thereof; as well as in the form of a thermosetting resin: phenol resins, urea resins, melamine resins, epoxy resins, and unsaturated polyester resins. Furthermore, elastomers, such as isoprene rubbers, butadiene rubbers, acrylonitrile-butadiene copolymer rubbers, and styrene-butadiene copolymer rubbers, may be used. Among the afore-listed synthetic resins, polyolefin resins, such as polyethylene, polypropylene, and ethylene-propylene copolymer resins, are preferable for the synthetic resin composition according to the present invention.

The synthetic resins can be used irrespective of the specific gravity, average molecular weight, melt viscosity, monomer composition, insoluble rate in a solvent, existence or nonexistence or type of stereoregularity, shape and size at the completion of the polymerization, type of a catalyst used for the polymerization, existence or nonexistence or method of a residual catalyst deactivation or removal treatment, existence or nonexistence, type, or concentration of a residual metal or acid component in the resin originated from a catalyst.

The kind of the wood flour used for the present invention is not particularly limited and any can be used as long as it is a ground matter of plant fiber. For example, the wood flour of Sugi (Cryptomeria), Tsuga (Tsuga), Hinoki (Chamaecyparis), Matsu (Pinus), Katsura (Cercidiphyllum), Kuri (Castanea), Buna (Fagus), Sakura (Prunus), Nara (Quercus), Momi (Abies), Lawan (lauan), etc. can be used. Form of the wood flour is preferably a ground product. Additionally, the ground product of which the particle diameter is 5-600 μm is preferable, because of advantages such as the achievement of good woody feeling. The content of the wood flour is 5-200 parts by mass, preferably 20-150 parts by mass per 100 parts by mass of the synthetic resin. It is unfavorable to add the amount less than 5 parts by mass since good woody feeling cannot be obtained, and to add the amount beyond 200 parts by mass because of tendency to deteriorate in mechanical properties such as impact resistance.

Examples of the alkyl group having 1 to 4 carbon atoms represented by $R^1$, $R^2$, $R^3$ and $R^4$ of the hindered amine compound used for the present invention containing the partial structure represented by the general formula (1) include methyl, ethyl, propyl, isopropyl, n-butyl, sec-butyl and tert-butyl.

Examples of the alkyl group having 1 to 18 carbon atoms represented by R in the general formula (1) and by $R^5$ in the general formula (2) include methyl, ethyl, propyl, isopropyl, n-butyl, sec-butyl, tert-butyl, pentyl, hexyl, heptyl, octyl, 2-ethylhexyl, nonyl, isononyl, decyl, undecyl, dodecyl, tridecyl, tetradecyl, pentadecyl, hexadecyl, heptadecyl and octadecyl. In addition, examples of the alkyl group substituted by a hydroxyl group include groups that correspond to the above-exemplified alkyl groups such as 2-hydroxyethyl, 2-hydroxypropyl, 3-hydroxypropyl and 2-hydroxy-2-methylpropyl.

Examples of the cycloalkyl group having 5 to 8 carbon atoms represented by R in the general formula (1) and by $R^5$ in the general formula (2) include cyclopentyl, cyclohexyl, cycloheptyl and cyclooctyl.

Specific examples of the hindered amine compound having a group represented by the general formula (1) include the following Compounds No. 1 to 6, provided that the present invention should not be construed to be limited by the following compounds in any manner.

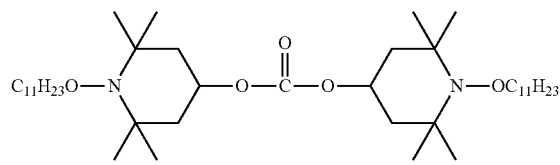

Compound No. 1

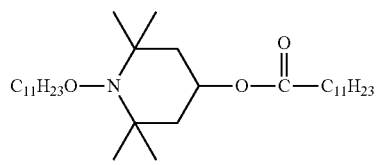

Compound No. 2

Compound No. 3

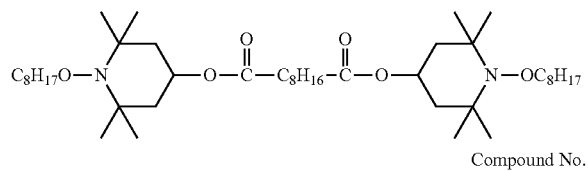

Comound No. 4

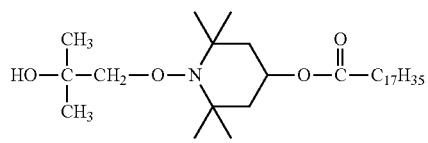

Compound No. 5

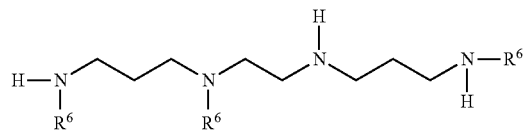

Compound No. 6

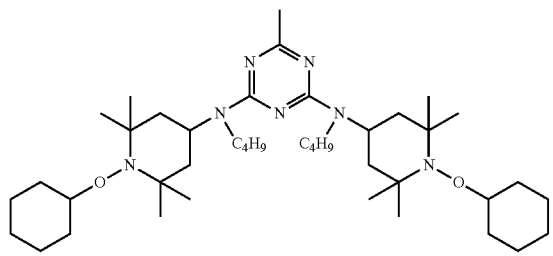

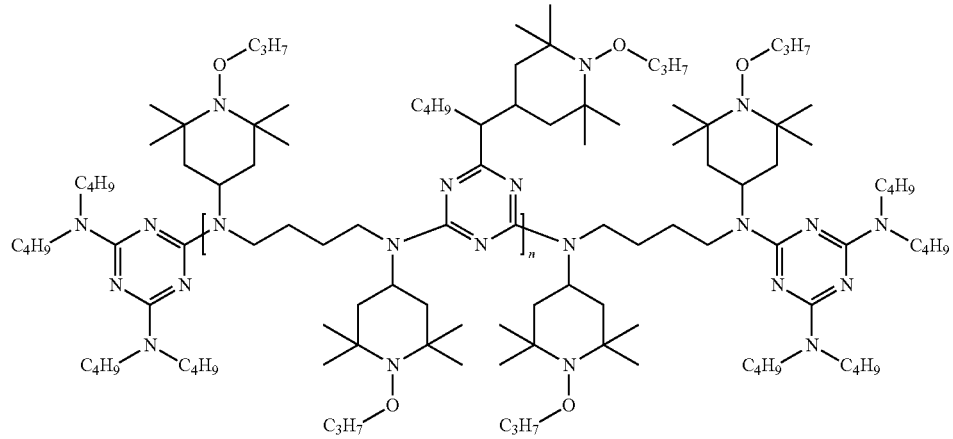

Among the above-described specific examples, the Compound No. 1 is preferable in view of especially high imparting activity of weather resistance.

The content of the hindered amine compound represented by the general formula (1) used for the present invention is 0.01 to 5 parts by mass, preferably 0.05 to 3.5 parts by mass per 100 parts by mass of the synthetic resin. When considering cost, it is more preferably 0.1 to 1 part by mass per 100 parts by mass of the synthetic resin.

In case the hindered amine compound is less than 0.01 part by mass, sufficient stabilizing activity cannot be obtained at initial stage, and reversely, in case it is beyond 5 parts by mass the appearance of the resin composition is deteriorated by blooming and the stabilizing activity is not improved substantially.

It is preferable to blend a compatibilizer to the woody synthetic resin composition of the present invention in order to improve compatibility, when the synthetic resin and wood flour are mixed. Examples of the compatibilizer include maleic acid-modified polypropylene resin. For example, a maleic anhydride-modified polypropylene resin of which the polyolefin is modified by unsaturated carboxylic acid is exemplified as the compatibilizer. The content of the compatibilizer is preferably 0.1 to 10% by mass, more preferably 1 to 5% by mass, as the amount in the woody synthetic resin composition. An amount of less than 0.1% by mass is not preferred, since there may be a case that compatibilizing effect cannot be obtained, and reversely, an amount of beyond 10% by mass is also not preferred, since there may be a case that mechanical properties of molded body such as flexural strength deteriorate.

The woody synthetic resin composition according to the present invention may contain in combination, as necessary, other additives, such as a phenolic antioxidant, a phosphorus-containing antioxidant, a sulfur-containing antioxidant, ultraviolet absorber, another hindered amine compound, a nucleating agent, a fire retardant, a fire retardant aid, a processing aid, such as ethylenebis stearic acid amide and erucic acid amide, a pigment, a filler, a plasticizer, a metallic soap, hydrotalcites, and an antistatic agent.

Examples of the phenolic antioxidant include 2,6-di-tert-butyl-p-cresol, 2,6-diphenyl-4-octadecyloxyphenol, stearyl (3,5-di-tert-butyl-4-hydroxyphenyl)propionate, distearyl(3, 5-di-tert-butyl-4-hydroxybenzyl)phosphonate, tridecyl.3,5-di-tert-butyl-4-hydroxybenzyl thioacetate, thiodiethylene bis [(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylpenol), bis[3,3-bis(4-hydroxy-3-tert-butylphenyl)butyric acid]glycol ester, 4,4'-butylidene-bis(2, 6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris (3,5-ditert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyl-oxyethyl] isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol bis-[β-(3-tert-butyl-4-hydroxy-5-methylphenyl)propionate] and tocopherol. The content of the phenolic antioxidant is 0.001 to 10 parts by mass, preferably 0.05 to 5 parts by mass per 100 parts by mass of the synthetic resin.

Examples of the phosphorus-containing antioxidant include triphenyl phosphite, tris(2,4-di-tert-butylphenyl) phosphite, tris(2,5-di-tert-butylphenyl)phosphite, tris(nonylphenyl) phosphite, tris(dinonylphenyl)phosphite, tris (mono- and di-nonylphenyl)phosphite, diphenyl acid phosphite, 2,2'-methylene bis(4,6-di-tert-butylphenyl)octyl phosphite, diphenyl decyl phosphite, diphenyl octyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol).1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra (C12-C15 mixed alkyl)-4,4'-isopropylidene diphenyl phosphite, bis[2,2'-methylenebis(4,6-diamylphenyl)].isopropylidene diphenyl phosphite, tetra(tridecyl).4,4'-butylidenebis(2-tert-butyl-5-methylphenol) diphosphite, hexa (tridecyl).1,1,3-tris(2-methyl-5-tert-butyl-4-hydroxyphenyl) butane.triphosphite, tetrakis(2,4-di-tert-butylphenyl) biphenylene diphosphonite, tris(2-[(2,4,7,9-tetrakis-tert-butyldibenzo[d,f][1,3,2]dioxaphosphepin-6-yl) oxy]ethyl) amine, 9,10-dihydro-9-oxa-10-phosphaphenanthrene-10-oxide, tris(2-[(2,4,8,10-tetrakis-tert-butyldibenzo[d,f][1,3,2] dioxaphosphepin-6-yl) oxy]ethyl)amine, 2-(1,1-dimethylethyl)-6-methyl-4-[3-[[2,4,8,10-tetrakis(1,1-dimethylethyl) dibenzo[d,f][1,3,2]dioxaphosphepin-6-yl]oxy]propyl] phenol and 2-butyl-2-ethylpropanediol.2,4,6-tri-tert-butylphenol monophosphite. The content of the phosphorus-containing antioxidant is preferably 0.001 to 10 parts by mass, more preferably 0.05 to 5 parts by mass per 100 parts by mass of the synthetic resin.

Examples of the sulfur-containing antioxidant include dialkyl thiodipropionates, such as dilauryl, dimyristyl, myristyl stearyl, and distearyl esters of thiodipropionic acid; and β-alkylmercaptopropionic acids esters of polyols, such as pentaerythritol tetra(β-dodecyl mercaptopropionate). The content of the sulfur-containing antioxidant is preferably 0.001 to 10 parts by mass, more preferably 0.05 to 5 parts by mass per 100 parts by mass of the synthetic resin.

Examples of the ultraviolet absorber include 2-hydroxy benzophenones, such as 2,4-dihydroxy benzophenone, 2-hydroxy-4-methoxy benzophenone, 2-hydroxy-4-octoxy benzophenone, and 5,5'-methylene bis(2-hydroxy-4-methoxy benzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, and 2,4-di-tert-amylphenyl-3,5-di-tert-butyl-4-hydroxybenzoate; substituted oxanilides, such as 2-ethyl-2'-ethoxyoxanilide, and 2-ethoxy-4'-dodecyloxanilide; cyanoacrylates, such as ethyl-α-cyano-β,β-diphenyl acrylate, and methyl-2-cyano-3-methyl-3-(p-methoxyphenyl) acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, 2-(2-hydroxy-4-propoxy-5-methylphenyl)-4,6-bis(2,4-di-tert-butylphenyl)-s-triazine. The content of the ultraviolet absorber is preferably 0.001 to 10 parts by mass, more preferably 0.05 to 5 parts by mass per 100 parts by mass of the synthetic resin.

Examples of another hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6-pentamethyl-4-piperidyl) sebacate, tetrakis(2,2,6,6-tetramethyl-4-piperidyl) butanetetracarboxylate, tetrakis (1,2,2,6,6-pentamethyl-4-piperidyl)butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl) .di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, a 1-(2-hydroxyethyl)-2,2,6,6-tetramethyl-4-piperidinol/diethyl succinate polycondensate, a 1,6-bis (2,2,6,6-tetramethyl-4-piperidylamino)hexane/dibromoethane polycondensate, a 1,6-bis(2,2,6,6-tetramethyl-4-piperidylamino)hexane/2,4-dichloro-6-morpholino-s-triazine polycondensate, a 1,6-bis(2,2,6,6-tetramethyl-4-piperidylamino)hexane/2,4-dichloro-6-tert-octylamino-s-triazine polycondensate, 1,5,8,12-tetrakis[2,4-bis (N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylaminoundecane and 1,6-(1,2,2,6,6-pentamethyl-4-piperidyl)amino)-s-triazine-6-ylaminoundecane. The content of another hindered amine is preferably 0.001 to 10 parts by mass, more preferably 0.05 to 5 parts by mass per 100 parts by mass of the synthetic resin.

Examples of the nucleating agent include metal salts of an aromatic carboxylic acid, such as aluminum p-tert-butyl benzoate and sodium benzoate; metal salts of an acidic phosphate ester, such as sodium bis(2,4-di-tert-butylphenyl)phosphate, lithium bis(2,4-di-tert-butylphenyl)phosphate and sodium 2,2'-methylene-bis(4,6-di-tert-butylphenyl)phosphate; and polyhydric alcohol derivatives, such as dibenzylidene sorbitol and bis(methylbenzylidene)sorbitol. The content of the nucleating agent is preferably 0.001 to 10 parts by mass, more preferably 0.01 to 5 parts by mass per 100 parts by mass of the synthetic resin.

Examples of the fire retardant include halogen type fire retardants, such as tetrabromobisphenol A and decabromodiphenyl ether; phosphorus type fire retardants based on inorganic phosphorus compounds, such as red phosphorus and melamine phosphate, and phosphate compounds, such as triphenyl phosphate, a phenol/resorcinol/phosphoric acid condensate, and a bisphenol A/2,6-xylenol/phosphoric acid condensate; inorganic fire retardants, such as magnesium hydroxide and aluminum hydroxide; and nitrogen-containing compounds, such as melamine cyanurate. The fire retardant should preferably be used in combination with a fire retardant aid, such as antimony oxide or a drip-preventing agent, such as a fluorine-contained resin and a silicone resin. The content of the fire retardant is preferably 0.1 to 200 parts by mass, more preferably 1 to 100 parts by mass per 100 parts by mass of the synthetic resin.

The pigment may be organic as well as inorganic, and examples thereof include white pigments, such as titanium oxide and zinc sulfide; black pigments, such as carbon black; green pigments, such as chromium oxide, chrome green, zinc green, chlorinated copper phthalocyanine green, phthalocyanine green, naphthol green and malachite green lake; blue pigments, such as ultramarine, iron blue, copper phthalocyanine blue, cobalt blue, phthalocyanine blue, fast sky blue, and indanthrene blue; red pigments, such as red lead, red iron oxide, basic zinc chromate, chrome vermilion, cadmium red, rose red, brilliant carmine, brilliant scarlet, quinacridone red, lithol red, vermilion, thioindigo red and mingamiya red; and yellow pigments, such as chrome yellow, zinc yellow, yellow iron oxide, titan yellow, fast yellow, hansa yellow, auramine lake, benzidine yellow, and indanthrene yellow. The content of the pigment is preferably 0. 5 to 20 parts by mass, more preferably 2 to 10 parts by mass per 100 parts by mass of the synthetic resin.

As the fillers are used glass fibers, talc, silica, calcium carbonate, etc. The surfaces of the fillers are preferably treated by a titanium-based or silane-based surface treatment agent to improve compatibility with resin. The content of the fillers is preferably 5 to 200 parts by mass, more preferably 10 to 100 parts by mass per 100 parts by mass of the synthetic resin.

As the metallic soap, are used salts between a metal, such as magnesium, calcium, aluminum, and zinc, and a saturated or unsaturated fatty acid, such as lauric acid, myristic acid, palmitic acid, stearic acid, behenic acid, and oleic acid. The soap can be used irrespective of the water content, melting point, particle size, composition of the fatty acids, selection of the production process between a metathetical process by a reaction of an alkali metal salt of a fatty acid with a metal oxide or hydroxide, and a direct process by a neutralization reaction of a fatty acid with a metal oxide or hydroxide in the presence or absence of a solvent, or whether either of the fatty acid or the metal is in excess. The content of the metallic soap is preferably 0.001 to 10 parts by mass, more preferably 0.01 to 5 parts by mass per 100 parts by mass of the synthetic resin.

As the hydrotalcites, both natural products and synthetic products can be used, and products modified by an alkali metal such as lithium and products of which a part of carbonate anion is substituted by perchloric acid can be also used. Especially, the product having a composition represented by the following general formula (3) is preferable:

$$Zn_xMg_yAl_2(OH)_{2(x+y+2)}CO_3 \cdot nH_2O \quad (3)$$

(wherein x is 0 to 3, y is 1 to 6, x+y is 4 to 6, and n is 0 to 10). The product can be used irrespective of the existence or nonexistence of crystal water or surface treatment. Although there is no particular restriction on the particle size, smaller size is preferable insofar as the properties of the hydrotalcite should not be lost. If the particle size is large, dispersibility becomes inadequate to decrease stabilizing activity, and the physical properties of the resulting resin composition, such as mechanical strengths and transparency, will be compromised. The content of the hydrotalcites is preferably 0.001 to 10 parts by mass, more preferably 0.005 to 5 parts by mass per 100 parts by mass of the synthetic resin.

As the plasticizer, various known plasticizers may be used depending on applied resin. Examples of ester-type plasticizer include dibasic acids, such as phthalic acid, naphthalene dicarboxylate, succinic acid, glutaric acid, adipic acid, and maleic acid; alkyl alcohols, such as octanol, isononyl alcohol, lauryl alcohol, stearyl alcohol; and diester compounds such as ether alcohols such as diethylene glycol monobutyl ether. Examples of polyester-type plasticizer include polyesters consisting of the above dibasic acids and glycols such as ethylene glycol, propylene glycol, butanediol, neopentyl glycol and hexanediol; and the polyesters of which the end is capped with the above monoalcohols or monocarboxylic acid compounds such as propyonic acid, octyl acid, and benzoic acid. Examples of polyether-type plasticizer include polyethers such as polyethylene glycol and polypropylene glycol. Examples of polyether-ester-type plasticizer include polyesters of polyether such as polyethylene glycol and polypropylene glycol and the above dibasic acids. The content of the plasticizer is preferably 0 to 20 parts by mass, more preferably 1 to 15 parts by mass per 100 parts by mass of the resin.

Examples of the antistatic agent include cationic antistatic agents, such as fatty acid quaternary ammonium ion salts and quaternary polyamine salts; anionic antistatic agents, such as higher alcohol phosphoric acid ester salts, higher alcohol EO adducts, polyethylene glycol fatty acid esters, anionic alkyl sulfonic acid salts, higher alcohol sulfuric acid ester salts, higher alcohol ethylene oxide adduct sulfuric acid ester salts and higher alcohol ethylene oxide adduct phosphoric acid ester salt; nonionic antistatic agents, such as polyhydric alcohol fatty acid esters, polyglycol phosphoric acid ester and polyoxyethylene alkylallyl ethers; amphoteric alkyl betaines, such as alkyl dimethylamino acetic acid betaine, and amphoteric antistatic agents, such as imidazoline type amphoteric activators. The antistatic agent may be used individually or two or more of them may be used in combination. The content of the antistatic agent is preferably 0.001 to 10 parts by mass, more preferably 0.01 to 5 parts by mass per 100 parts by mass of the resin.

Furthermore, the woody synthetic resin composition of the present invention may be extrusion-molded with the addition of a foaming agent. As the foaming agent, thermal-decomposition-type foaming agents can be preferably used. Inorganic thermal-decomposition-type foaming agents such as sodium bicarbonate and ammonium carbonate, organic thermal-decomposition-type foaming agents such as azodicarbonamide (ADCA), and mixture thereof may be used.

For the respective ingredients, the contents and qualities thereof are selected appropriately in accordance with the resin types, process conditions and end uses. Addition of the ingredients into a resin may be carried out according to a conventional process, such as a process in which each ingredient is mixed independently into the resin by, for example, a Henschel mixer and supplied to a processing machine; a process in which ingredients other than the resin are mixed preliminarily in a given combination, formed into powder or granule and added to the resin; a process in which master pellets containing high concentration ingredients in a resin are added to the resin; and a process in which ingredients are fed to the resin through a feeding port different from the port for the resin using an extruder having a plurality of feeding ports.

There is no particular restriction on a molding process for the woody synthetic resin composition, and the composition can be molded by a conventional process, such as extrusion molding, injection molding, compression molding, and laminate molding, selected depending on a resin to be used, existence of fillers, etc.

Although the usage of the woody synthetic resin composition of the present invention is not particularly limited, it is preferably used for building materials, automotive interior materials and the like. As the building materials, the composition may be used for exterior members such as an outdoor fence, a lattice and floor materials (balcony and deck); interior members such as inner wall materials, ceiling materials, stair handrails and furniture materials; and other materials such as materials for toy and esplanade.

EXAMPLES

The present invention will be described in more detail by way of examples thereof. The present invention is not limited by the Examples.

Examples 1 to 4 and Comparative Examples 1 to 4

The test pieces of 2 mm in thickness were prepared by dry-blending 45 parts by mass of an ethylene-propylene copolymer resin (MFR=25, density=0.90 g/cm$^3$, flexural modulus=1,700 MPa), 55 pats by mass of a wood flour (produced by Sankyo Seifun Co., Ltd., Ecomills Superfeeder #100), 5.0 parts by mass of maleic anhydride-modified polypropylene (produced by Sanyo Chemical Industries, Ltd., Yumex 1010), 0.1 part by mass of tetrakis[methylene-3-(3,5-di-tert-butyl-4-hydroxyphenyl)propionate]methane, 0.1 part by mass of tris(2,4-di-tert-butylphenyl)phosphite, 0.05 part by mass of calcium stearate, and light stabilizer (hindered amine compound (HALS) and ultraviolet absorber described in Table 1: the content in Table 1 stands for a part by mass), pelletizing the blend at 190° C. with a two-axis extruder, and then press-forming the pellet at 180° C.

The weather resistance of a test piece was evaluated by means of the time to cracking (hr), the residual rate of gloss (%) and the color difference (ΔE) at black panel temperature of 83° C. under the raining test condition (sprinkling of ion exchanged water: 18 minutes/120 minutes) by a Sunshine weather meter (produced by Suga test instruments Co., Ltd.). The results obtained are together shown in Table 1 below.

The gloss (unitless) was measured by Gloss Meter, Model TC-108D (produced by Tokyo Denshoku CO., LTD.).

TABLE 1

|  |  |  | Example | | | | Comparative Example | | | |
|---|---|---|---|---|---|---|---|---|---|---|
|  |  |  | 1 | 2 | 3 | 4 | 1 | 2 | 3 | 4 |
| Composition | Compound No. 1*[1] | | 0.05 | 0.2 | — | 1.5 | — | — | — | — |
|  | Compound No. 3*[2] | | — | — | 0.2 | — | — | — | — | — |
|  | Comparative compound 1*[3] | | — | — | — | — | 0.2 | — | — | — |
|  | Comparative compound 2*[4] | | — | — | — | — | — | 0.2 | — | — |
|  | Ultraviolet absorber*[5] | | 0.2 | 0.2 | 0.2 | 0.2 | 0.2 | 0.2 | 0.2 | — |
| Evaluation of weather resistance | Time to cracking (hr) | | 1320 | 1680 | 1320 | 2040 | 480 | 480 | 480 | 360 |
|  | Residual rate of gloss (%) | 120 hr | 65 | 70 | 68 | 72 | 66 | 64 | 70 | 63 |
|  |  | 360 hr | 63 | 68 | 62 | 70 | 34 | 43 | 18 | 9 |
|  |  | 1080 hr | 24 | 64 | 38 | 68 | — | — | — | — |
|  |  | 1320 hr | — | 22 | — | 63 | — | — | — | — |
|  | Color difference (ΔE) | 120 hr | 28.7 | 25.9 | 32.7 | 24.3 | 35.1 | 35.0 | 33.6 | 39.3 |
|  |  | 360 hr | 48.0 | 45.6 | 46.2 | 38.5 | 47.7 | 49.9 | 45.9 | 51.7 |
|  |  | 1080 hr | 54.8 | 51.3 | 54.4 | 43.8 | — | — | — | — |
|  |  | 1320 hr | — | 54.0 | — | 48.6 | — | — | — | — |
|  |  | 1680 hr | — | — | — | 52.4 | — | — | — | — |

*[1]Compound No. 1 is the above-described Compound No. 1.

*[2]Compound No. 3 is the above-described Compound No. 3.

*[3]Comparative compound 1 is the following Comparative compound 1 (NH type HALS).

*[4]Comparative compound 2 is the following Comparative compound 2 (N—Me type HALS).

*[5]Ultraviolet absorber is the following Compound No. 7

(benzotriazole type ultraviolet absorber).

Comparative compound 1

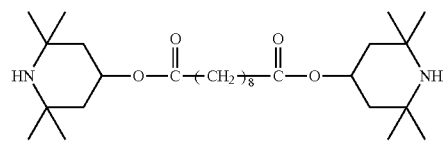

Comparative compound 2

TABLE 1-continued

| | Example | | | | Comparative Example | | | |
|---|---|---|---|---|---|---|---|---|
| | 1 | 2 | 3 | 4 | 1 | 2 | 3 | 4 |

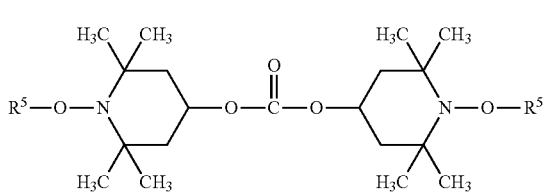

Compound No. 7

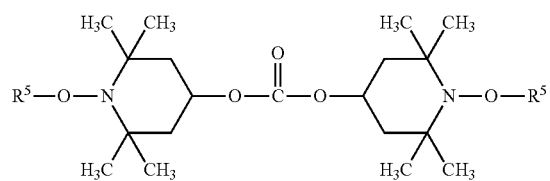

It is obvious from the results shown in Table 1 that Examples 1-4 containing the specific hindered amine compound exhibit remarkably excellent results, compared with Comparative Examples 1 and 2 containing Comparative compound and Comparative Examples 3 and 4 without the specific hindered amine compound. Above all, it is further clear that Compound No. 1, as shown in Example 1, is far superior to other light stabilizers even in a small amount, and exhibits a remarkably excellent result.

Consequently, the present invention can provide a woody synthetic resin composition having excellent weather resistance and a molded body thereof.

The invention claimed is:

1. An automotive interior material obtained by molding a woody synthetic resin composition comprising a wood flour in an amount of 5 to 200 parts by mass and a hindered amine compound having a partial structure represented by the following general formula (2):

$$
\text{(2)}
$$

(structure of formula 2)

wherein $R^5$ represents an alkyl group having 1 to 18 carbon atoms, an alkyl group substituted by hydroxyl group having 1 to 18 carbon atoms or cycloalkyl group having 5 to 8 carbon atoms, in an amount of 0.01 to 5 parts by mass, with respect to 100 parts by mass of a synthetic resin.

2. The automotive interior material according to claim 1, wherein the synthetic resin is a polyolefin-based resin.

3. The automotive interior material according to claim 2, wherein the polyolefin-based resin is a polyethylene resin, a polypropylene-resin, or an ethylene-propylene copolymer resin.

4. A woody synthetic resin composition comprising
a wood flour in an amount of 5 to 200 parts by mass,
a hindered amine compound having a partial structure represented by the following general formula (2):

$$
\text{(2)}
$$

(structure of formula 2)

wherein $R^5$ represents an alkyl group having 1 to 18 carbon atoms, an alkyl group substituted by hydroxyl group having 1 to 18 carbon atoms or a cycloalkyl group having 5 to 8carbon atoms, in an amount of 0.01 to 5 parts by mass, with respect to 100 parts by mass of a synthetic resin, and
a compatibilizer in an amount of 0.1 to 10% by mass with respect to the woody synthetic resin composition, wherein the compatibilizer is maleic acid-modified polypropylene resin.

5. An automotive interior material obtained by molding the woody synthetic resin composition according to claim 4.

* * * * *